US008527898B2

(12) United States Patent
Jensen et al.

(10) Patent No.: US 8,527,898 B2
(45) Date of Patent: *Sep. 3, 2013

(54) DIRECTION-BASED DATA ENTRY SYSTEM

(75) Inventors: Christian Bogh Jensen, Charlottenlund (DK); Erik Dibbern, Hillerod (DK); Ricky Kaare Engelharth, Frederiksberg (DK)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/155,330

(22) Filed: Jun. 7, 2011

(65) Prior Publication Data

US 2011/0239152 A1    Sep. 29, 2011

Related U.S. Application Data

(63) Continuation of application No. 11/956,772, filed on Dec. 14, 2007, now Pat. No. 7,971,152.

(51) Int. Cl.
*G06F 3/048* (2013.01)
(52) U.S. Cl.
USPC ............ 715/780; 715/765; 715/856; 715/810
(58) Field of Classification Search
USPC ................. 715/764, 765, 780, 810, 812, 856, 715/863; 345/156, 157, 163
See application file for complete search history.

(56) References Cited

U.S. PATENT DOCUMENTS

| | | | |
|---|---|---|---|
| 4,739,314 A | 4/1988 | McCaskill et al. | |
| 5,615,347 A | 3/1997 | Davis et al. | |
| 6,282,315 B1 | 8/2001 | Boyer | |
| 6,340,967 B1 | 1/2002 | Maxted | |
| 6,433,776 B1 | 8/2002 | Todd | |
| 6,498,601 B1 | 12/2002 | Gujar et al. | |
| 7,554,521 B1 | 6/2009 | Migos et al. | |
| 2002/0196978 A1 | 12/2002 | Hawkins et al. | |
| 2003/0117380 A1 | 6/2003 | Kanzaki | |
| 2003/0222925 A1 | 12/2003 | Regelous | |
| 2006/0007189 A1 | 1/2006 | Gaines et al. | |
| 2006/0085767 A1 | 4/2006 | Hinckley et al. | |
| 2006/0159345 A1 | 7/2006 | Clary et al. | |
| 2006/0244738 A1 | 11/2006 | Nishimura et al. | |
| 2008/0066020 A1 | 3/2008 | Boss et al. | |
| 2008/0076501 A1 | 3/2008 | Mares et al. | |
| 2008/0224995 A1 | 9/2008 | Perkunder | |

OTHER PUBLICATIONS

McQueen, Craig et al., "A Comparison of Four Methods of Numeric Entry on Pen-Based Computers," Proceedings of Graphics Interface '94, Toronto, Canadian Information Processing Society (pp. 75-82), 1994.
Chen, Jian et al., "Designing Explicit Numeric Input Interfaces for Immersive Virtual Environments," (10 pages), 2004.
Isokoski, Poika et al., "Comparison of Two Touchpad-Based Methods for Numeric Entry," Conference on Human Factors in Computing Systems, 2002 (pp. 25-32).

*Primary Examiner* — Xiomar L Bautista
(74) *Attorney, Agent, or Firm* — Perkins Coie LLP

(57) ABSTRACT

A direction-based data entry system displays a field having an initial value and a field location. When the user selects the field, the direction-based data entry system enters a data entry mode in which an auxiliary data entry tool is not displayed. To enter a new value for the field, the user indicates movement across the display relative to the field. As the user indicates movement, the direction-based data entry system may display an indication of a new value for the field represented by the movement. When the new value is the value that the user wants entered into the field, the user terminates the movement, which causes the new value to be the current value for the field.

38 Claims, 6 Drawing Sheets

DIRECTION-BASED DATA ENTRY SYSTEM

CROSS REFERENCE TO RELATED APPLICATION

This application is a continuation application of U.S. patent application Ser. No. 11/956,772, filed on Dec. 14, 2007 now U.S. Pat. No. 7,971,152 and entitled "DIRECTION-BASED DATA ENTRY SYSTEM," which is incorporated herein in its entirety by reference.

BACKGROUND

Conventional computing devices provide keyboards and pointing devices to assist in data entry. An application program executing on such a computing device may display a form with various fields. A user may use the keyboard or pointing device to select a field of interest and enter a value into the field. If the field is a conventional text field, then the user may use the keyboard to enter a textual or numeric value into the field. Certain fields may have a list of possible values for the fields. In such a case, the possible values may be listed in a "drop-down list" from which the user can select a desired value using either the keyboard or the pointing device. Some numeric fields may be represented by a slider with the beginning of the slider corresponding to the minimum value for the field, the end of the slider corresponding to the maximum value of the field, and an indicator between the beginning and the end of the slider representing the current value of the field. For example, a slider may be used to designate the currently displayed frame of a movie. As the movie is played, the indicator of the slider moves from the beginning to the end to indicate the number of the current frame. A user may be able to select the scroll box and move it toward the beginning to "rewind" the movie or the end to "fast forward" the movie. Drop-down lists and scroll bars are examples of "auxiliary data entry tools" in that they are displayed to assist a user in selecting a new value for a field. Other "auxiliary data entry tools" may include standard combo boxes, drop-down combo boxes, spin boxes, and so on.

Many computing devices, such as cell phones, personal digital assistants, and electronic tablets, do not have conventional keyboards for data entry. Such computing devices rely on "pointing" by a user to select new values for fields. A user can point using a stylus, their finger, or a mouse. To input a numeric value, the computing device may display a numeric pad in response to a selection of a field by the user. The user then points to the numbers in sequence to input a numeric value. The computing device may similarly display a keyboard to allow entry of alphabetic characters. Some fields may have an ordered list of possible values (e.g., days of the week) and may allow the user to select subsequent values in the list by tapping on the display.

Such data entry techniques, however, can be cumbersome. It can be time-consuming to search for and use a stylus to select characters of a displayed keyboard. Also, a user who taps one too many times on the display when selecting from an ordered list may need to restart the tapping or loop through the list of possible values to find the value of interest.

SUMMARY

A method and system for direction-based data entry by specifying movement by a user is provided. A direction-based data entry system displays a field having an initial value and a field location. When the user selects the field, the direction-based data entry system enters a data entry mode. To enter a new value for the field, the user indicates movement across the display relative to the field. As the user indicates movement, the direction-based data entry system may display an indication of a new value for the field represented by the movement. When the new value is the value that the user wants entered into the field, the user terminates the movement, which causes the new value to be the current value for the field. In this way, a user can easily select a new value for a field without having to display an auxiliary data entry tool to guide the selection of the new value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
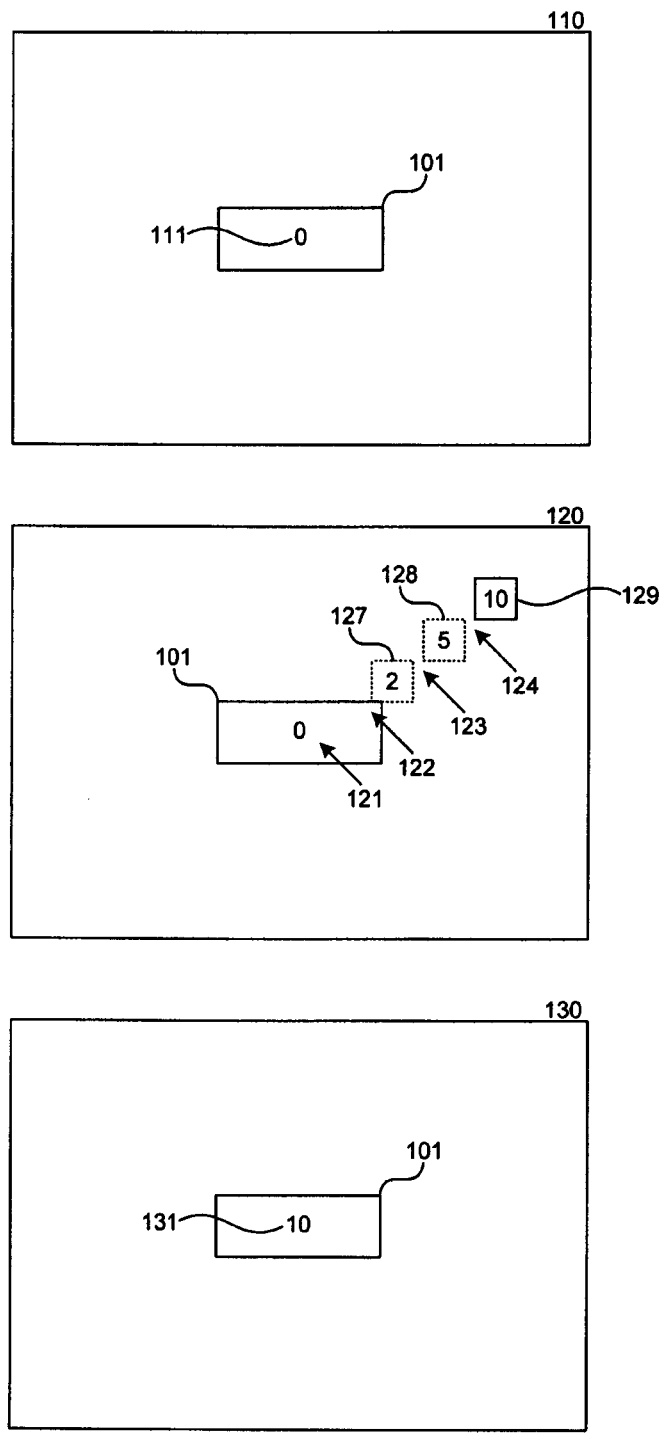
FIG. 1 illustrates the modifying of the value within a field based on directional movement in a positive or forward direction.

A method and system for direction-based data entry by specifying movement by a user is provided. In some embodiments, a direction-based data entry system displays a field having an initial value and a field location. For example, if the field is for data entry of a state (e.g., Alabama, Alaska, and so on), the initial value may be Alabama, which is the first state in alphabetical order. The field location may indicate the boundary of the field designated by the upper left corner and a lower right corner on the display allocated for the field. When the user selects the field, the direction-based data entry system enters a data entry mode. A user may select a field by pointing to the field with a stylus or a finger when the display is touch-sensitive or by pointing to the field with a mouse and depressing a button. To enter a new value for the field, the user indicates movement across the display relative to the field. The user may indicate movement by moving a stylus, finger, or mouse pointer across the display. As the user indicates movement, the direction-based data entry system may display an indication of a new value for the field represented by the movement. The data entry system may display the new value within the field, adjacent to the field, near the position of the movement, at a fixed location on the display, and so on. For the state field, the new values are the successively displayed states in alphabetical order. When the new value is the value that the user wants entered into the field, the user terminates the movement, which causes the new value to be the current value for the field. The user may terminate movement by lifting the stylus or finger from the touch-sensitive display or by releasing the mouse button. The direction of movement indicates whether the next value or previous value in a sequence of values for the field is the new value. For example, when a user selects the state field, subsequent movement in the upper direction or right direction from the field may indicate to select the states in alphabetical order, and the movement in the lower direction or the left direction may indicate to select the states in reverse alphabetical order. Upon termination, the new value currently displayed replaces the initial value. If a user moves back to the field and terminates the movement, then the direction-based data entry system may leave the initial value in the field. This allows a user to effectively abort the changing of the value of the field. In this way, a user can easily select a new value for a field without having to display an auxiliary data entry tool to guide the selection of the new value.

In some embodiments, the direction-based data entry system selects a value based on the speed of movement. The quick movement will result in quickly moving through the possible values for the field. For example, if the movement is quickly to the right from the state field, then the new value would be a state toward the end of the alphabetically ordered list of states. If the movement continues, the list may wrap around to the beginning of the list. If the direction of the movement is then reversed, the new values would be the states in reverse alphabetical order.

In some embodiments, some fields may contain values with multiple parts. For example, a real number may have an integer part and a decimal part; a ZIP code may have a five-digit first part and a four-digit second part; and a telephone number may have a three-digit area code part, a three-digit prefix part, and a four-digit number part. The direction of movement may indicate which part of a multipart value is to be modified. For example, in the case of a real number with a decimal part and an integer part, movement in the up and down direction may indicate to increase or decrease the integer part, and movement in the left and right direction may indicate to increase or decrease the decimal part.

FIG. 1 illustrates the modifying of the value within a field based on directional movement in a positive or forward direction. A display 110 includes a data entry field 101 with an initial value 111 of zero. A display 120 illustrates the selection of the field and subsequent movement. The field 101 is selected by pointing to the field using a finger, stylus, mouse, and so on as illustrated by arrow 121. The movement in the upper right direction from the field is illustrated by arrows 122-124. The direction-based data entry system may display the new value at a position associated with the position of the current movement. For example, the new value 127 of 2 is displayed next to arrow 122, the new value 128 of 5 is displayed next to arrow 123, and the new value 129 of 10 is displayed near arrow 124. If the user then terminates the movement, then the displayed new value is displayed in the field as illustrated by a display 130. In this case, the new value 131 of 10 is displayed in the field 101. If the user had alternatively terminated the movement within the field 101 itself, then the direction-based data entry system would leave the initial value displayed. In addition, rather than displaying the new value near the movement, the direction-based data entry system may display the new value within the field 101 itself during the course of the movement. Such updating of the value within the field may be appropriate when the initial value has no particular relationship to the new value to be selected, such as the first state in an alphabetical listing of the states.

Figure 2:
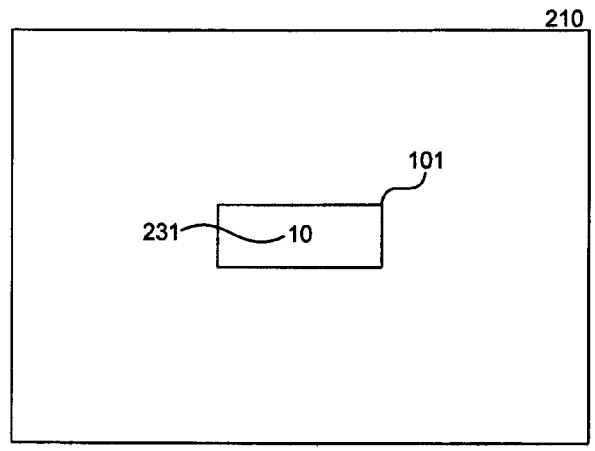
FIG. 2 illustrates the modifying of the value within a field based on directional movement in the negative or reverse direction.
Figure 2:
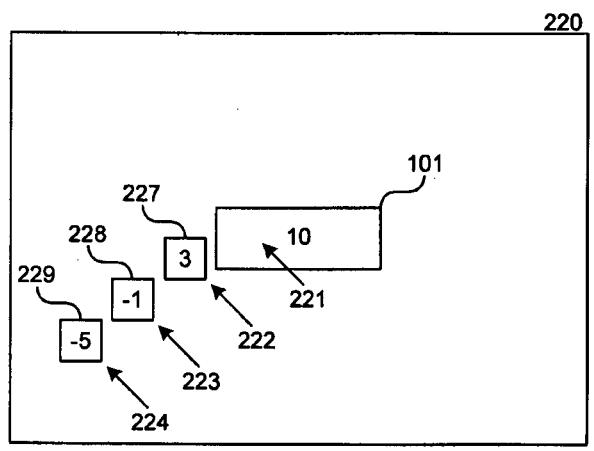
Figure 2:
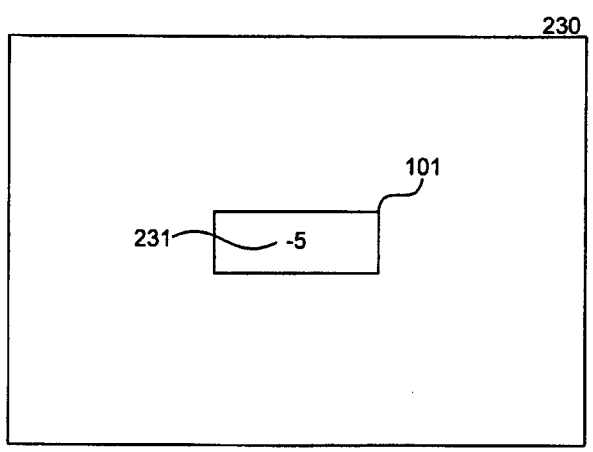

FIG. 2 illustrates the modifying of the value within a field based on directional movement in the negative or reverse direction. A display 210 includes a field 101 that includes an initial value 231 of 10. A display 220 illustrates the selection of the field and subsequent movement. The field 101 is selected by pointing to the field as illustrated by arrow 221. The movement in the lower left direction from the field is illustrated by arrows 222-224. The direction-based data entry system may display the new value at a position associated with the position of the current movement. For example, the new value 227 of 3 is displayed next to arrow 222, the new value 228 of −1 is displayed next to arrow 223, and the new value 229 of −5 is displayed next to arrow 224. If the user then terminates the movement, the current new value is displayed within the field. A display 230 illustrates that the new value 231 of −5 has been displayed within the field 101.

Figure 3:
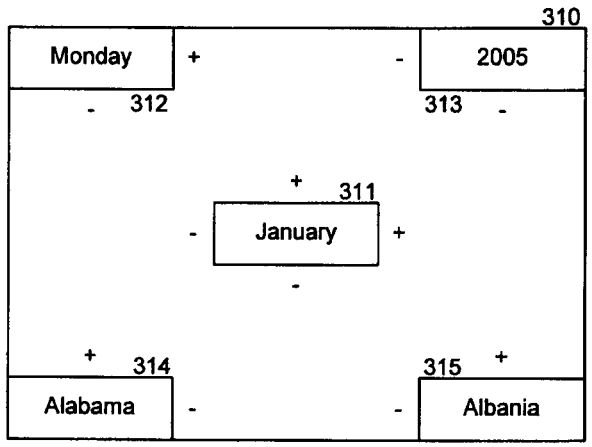
FIG. 3 illustrates the effects of different directions of movement on the new values for a field.
Figure 3:
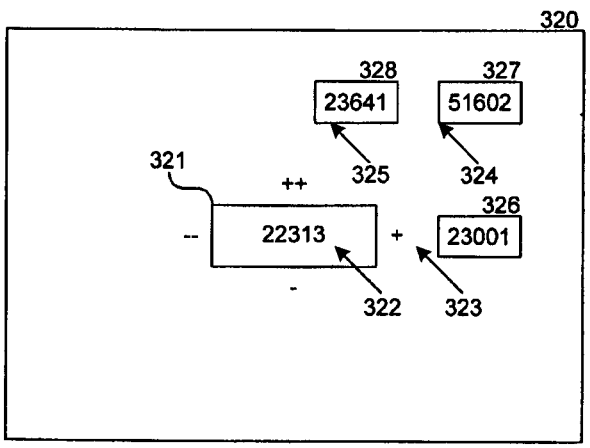
Figure 3:
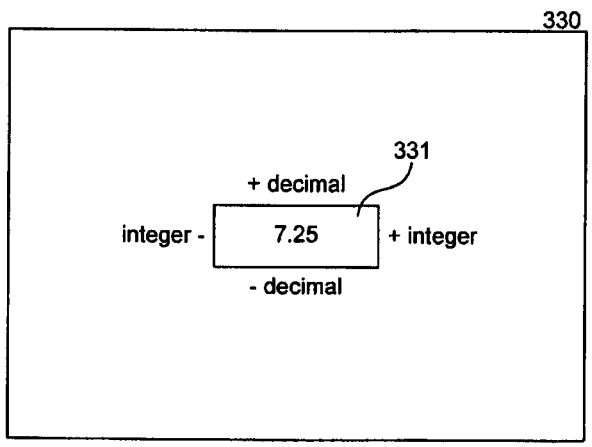

FIG. 3 illustrates the effects of different directions of movement on the new values for a field. A display 310 illustrates the effect of a direction on the new values for fields 311-315. The field 311 allows entry of a month of the year. The positive signs above and to the right of the field 311 indicate that movement in the upper direction or right direction will select the months in increasing order. The negative signs below and to the left of the field 311 indicate that movement in the lower direction or left direction will select the months in decreasing order. The field 312 allows entry of a day of the week. The positive sign to the right of the field 312 indicates that movement in the right direction will select the days of the week in increasing order, and the negative sign below the field 312 indicates that movement in the lower direction will select the days of the week in decreasing order. The field 313 allows entry of a year. The positive sign to the left of the field 313 indicates that the movement in the left direction will select the years in increasing order, and the negative sign below the field 313 indicates that movement in the lower direction will select the years in decreasing order. The field 314 allows entry of a state. The positive sign above the field 314 indicates that movement in the upper direction will select the states in increasing alphabetical order, and the negative sign to the right of the field 314 indicates that movement in the right direction will select the states in decreasing alphabetical order. The field 315 is for entry of a country. The positive sign above the field 315 indicates that movement in the upper direction will select the countries in increasing alphabetical order, and the negative sign to the left of the field 315 indicates that movement in the left direction will select the countries in decreasing alphabetical order. The fields that are adjacent to the boundary of the display will not support movement in all four directions. In such a case, the direction-based data entry system may define default behavior for the directions in a precedent order for increasing order. For example, the precedent order may be above, right, and left. This precedent order means that when movement above is possible, it will be assigned a positive sign. If movement above is not possible but movement to the right is possible, then movement to the right is assigned a positive sign. If movement above and to the right is not possible, then movement to the left is assigned a positive sign.

A display 320 illustrates movement with changing directions. A field 321 has an initial value of 22313. When a user selects the field by pointing to it as indicated by arrow 322, the direction-based data entry system enters the data entry mode. Initial movement in the right direction as indicated by arrow 323 will select new values in increasing order such as new value 326 of 23001 as indicated by the positive sign to the right of the field 321. If the user then switches direction and moves in the upper direction as indicated by arrow 324, then the movement will select new values in increasing order at a fast rate, such as new value 327 of 51602,as indicated by the double positive sign above the field 321. If the user then switches direction and moves in the left direction as indicated by arrow 325, then the movement will select new values in decreasing order at a fast rate, such as new value 328 of 23641, as indicated by the double negative sign to the left of the field 321.

A display 330 includes a field 331 with a multipart value. In this case, the value is a real number 7.25 with an integer part of 7 and a decimal part of 0.25. After selection of the field, if movement is in the right or left direction, then the new value for the integer part is increased or decreased, respectively. If movement is in the upper or lower direction, then the new value for the decimal part is increased or decreased, respectively.

Figure 4:
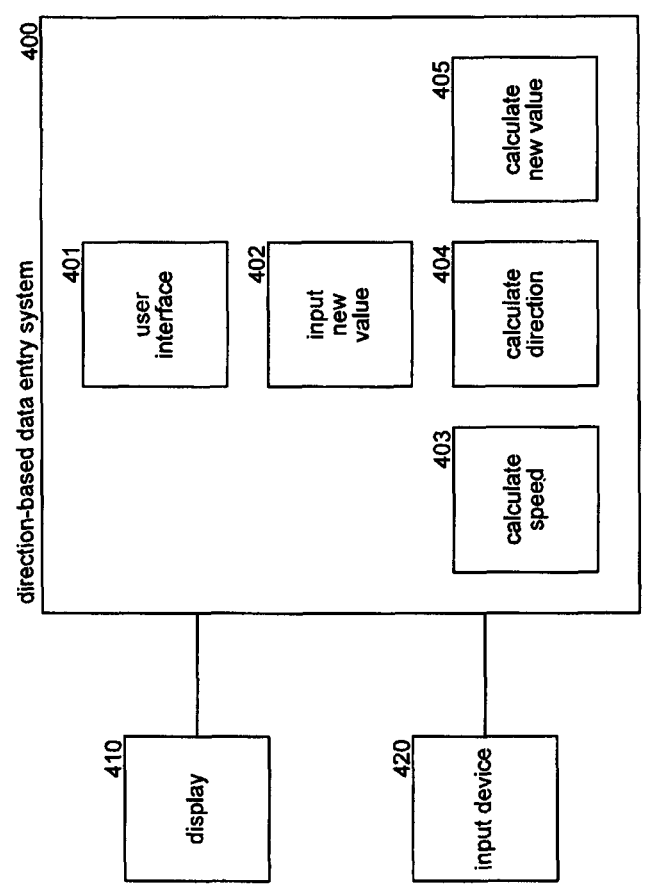
FIG. 4 is a block diagram illustrating components of the direction-based data entry system in some embodiments.

FIG. 4 is a block diagram illustrating components of the direction-based data entry system in some embodiments. The direction-based data entry system 400 may be implemented on a computing device that includes a display 410 and an input device 420. The display may be a touch-sensitive screen. The input device may be a stylus or a mouse. The direction-based data entry system includes a user interface component 401, an input new value component 402, a calculate speed component 403, a calculate direction component 404, and a calculate new value component 405. The user interface component may be part of an application program executing on the computing device to control the user interface that is displayed. The user interface component may invoke the input new value component to input a new value for a field of the user interface. The input new value component selects a new value for the field based on the direction of movement indicated by the user. The calculate speed component calculates the speed of movement, which may indicate how quickly to increase or decrease the new value for the field. The calculate direction component calculates the direction of the most recent movement. The calculate new value component determines a new current value based on the speed, direction, and range or list of possible values for the field.

The computing device on which the direction-based data entry system is implemented may include a central processing unit, memory, input devices (e.g., keyboard and pointing devices), output devices (e.g., display devices), and storage devices (e.g., disk drives). The memory and storage devices are tangible computer-readable storage media that may be encoded with computer-executable instructions that implement the system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the direction-based data entry system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The direction-based data entry system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
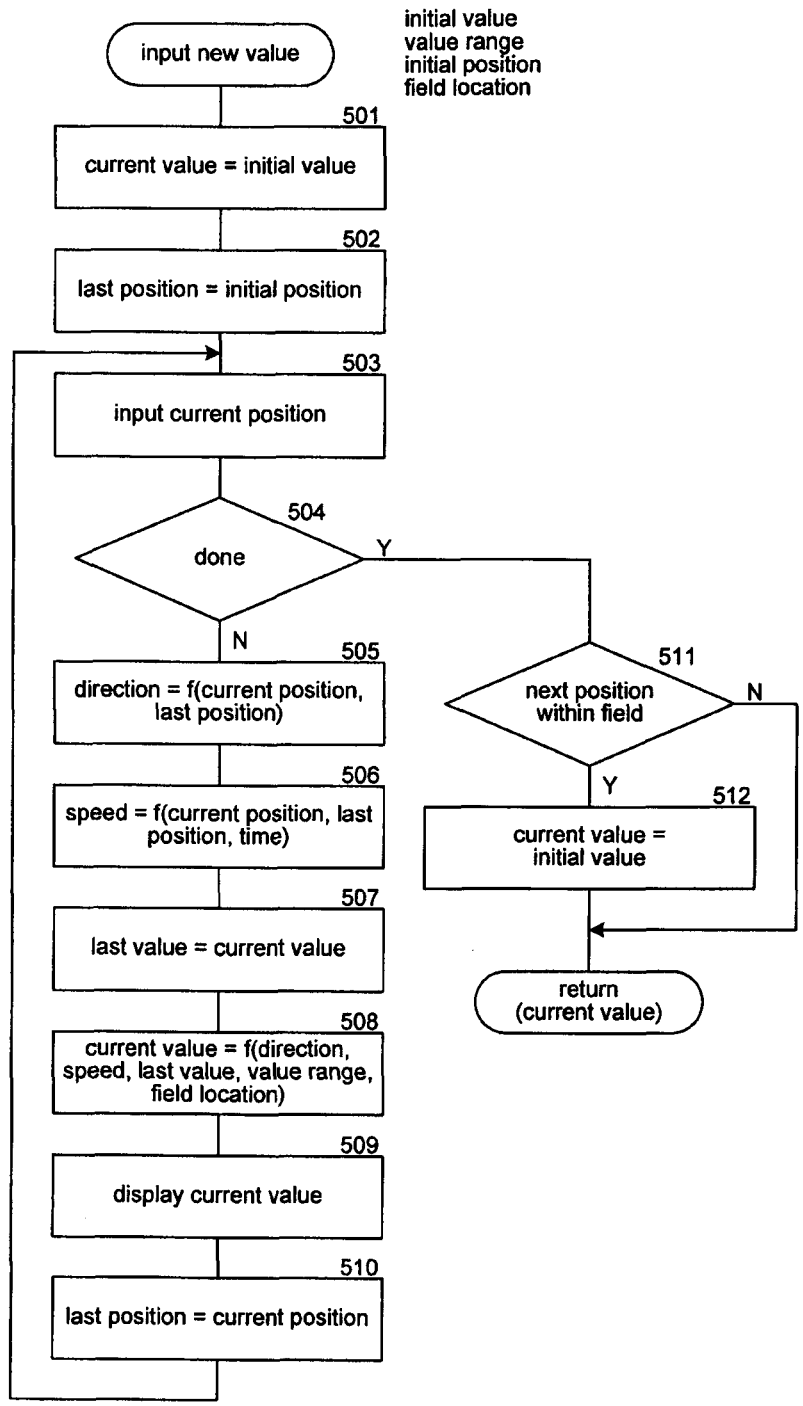
FIG. 5 is a flow diagram that illustrates the processing of the input new value component of the direction-based data entry system in some embodiments.

FIG. 5 is a flow diagram that illustrates the processing of the input new value component of the direction-based data entry system in some embodiments. The component may be passed the initial value of the field, along with the value range, initial position, and field location, and returns a new value for the field. The field location identifies the boundaries of the field, and the initial position indicates the position within the field location that the user selected when selecting the field. The component receives indications of sequences of positions, determines the new value associated with the current position, and displays that new value near that indicated position. The component returns when a user terminates the movement, such as by lifting the stylus from the display or releasing the mouse button. In block 501, the component initializes the current new value to the initial value. In block 502, the component sets the last position of movement to the initial position. In blocks 503-510, the component loops updating the current new value until the user terminates the movement. In block 503, the component inputs the current position of movement. In decision block 504, if the movement has terminated, then the component continues at block 511, else the component continues at block 505. In block 505, the component calculates the direction of movement as a function of the current position and the last position. In block 506, the component calculates the speed of movement as a function of the current position, the last position, and the time in between receiving indications of movement. In block 507, the component sets the last value to the current new value. In block 508, the component sets the current new value to a function of the direction and speed of movement along with the last value, the value range, and the field location by invoking the calculate new value component. In block 509, the component displays the current new value near the current position. In block 510, the component sets the last position to the current position and then loops to block 503 to input the next current position of movement. In decision block 511, if the current position is within the field indicating that the user returned to the field and terminated the movement, then the component continues at block 512. In block 512, the component resets the current new value to the initial value, meaning that the value of the field is not changing. The component then returns the current new value.

Figure 6:
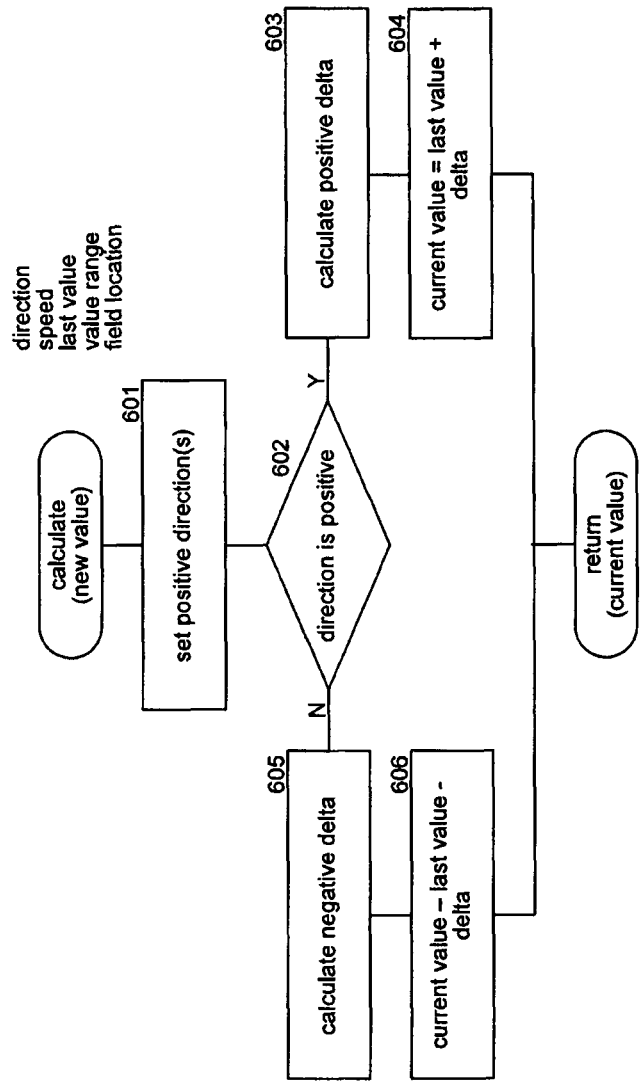
FIG. 6 is a flow diagram that illustrates the processing of the calculate new value component of the direction-based data entry system in some embodiments.

FIG. 6 is a flow diagram that illustrates the processing of the calculate new value component of the direction-based data entry system in some embodiments. The component is passed a direction and a speed along with the last value, the value range, and the field location. In block 601, the component sets the positive direction(s) for the current field location. For example, if the field is at the upper left corner, then the positive direction may be in the right direction, whereas if the field is in the upper right corner, then the positive direction may be in the left direction. In decision block 602, if the passed direction is in the positive direction, then the component continues at block 603, else the component continues at block 605. In block 603, the component calculates a positive delta for the new value, which may factor in the speed of movement, the difference between the current position and the last position, the direction, and so on. For example, if the speed is above a threshold speed, the component may select a positive delta to select the last value in the value range. If the last new value was already the last value in the value range, then the component may wrap the new value to the first value in the value range. In block 604, the component sets the current new value to the last value plus the positive delta. In block 605, the component calculates a negative delta for the new value, which may factor in the speed of movement, the difference between the current position and the last position, the direction, and so on. For example, if the speed is above a threshold speed, the component may select a negative delta to select the first value in the value range. If the last new value was already the first value in the value range, then the component may wrap the new value to the last value in the value range. In block 606, the component sets the current new value to the last value minus the negative delta. The component then returns the current new value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The value range for a field may represent any ordered information from which a user can determine whether, given a currently displayed value, a desired value is in the increasing or forward direction or in the decreasing or reverse direction. Accordingly, the invention is not limited except as by the appended claims.

We claim:

1. A computer-readable storage medium embedded with instructions for controlling a computing device to allow entry of data into a displayed field, by a method comprising:
   displaying a field at a field location;
   receiving a selection of the displayed field;
   after receiving the selection of the displayed field,
      receiving indications of movement relative to the field location; and
      receiving an indication of termination of the movement; and
   after receiving the indication of termination of the movement,
      determining a value for the field based on the movement; and
      displaying the determined value in the displayed field.

2. The computer-readable storage medium of claim 1 including displaying indications of values for the field during the movement.

3. The computer-readable storage medium of claim 2 wherein the indications of the values are displayed at positions associated with the positions of the current movement.

4. The computer-readable storage medium of claim 2 wherein the indications of the values are displayed at a fixed location.

5. The computer-readable storage medium of claim 2 wherein the indications of the values are displayed in the displayed field.

6. The computer-readable storage medium of claim 2 wherein the indications of the values are displayed adjacent to the displayed field.

7. The computer-readable storage medium of claim 2 wherein the displayed indications of the values are determined based on speed of the movement.

8. The computer-readable storage medium of claim 2 wherein the displayed indications of values are determined based on direction of the movement.

9. The computer-readable storage medium of claim 2 wherein a single value at a time is displayed during the movement.

10. The computer-readable storage medium of claim 2 wherein values displayed during the movement are based on distance between the field location and location of the movement.

11. The computer-readable storage medium of claim 2 wherein values displayed during the movement are based on speed of the movement.

12. The computer-readable storage medium of claim 2 wherein values displayed during the movement are based on direction of the movement.

13. The computer-readable storage medium of claim 12 wherein positive values are displayed when movement is to the right of the displayed field and negative values are displayed when movement is to the left of the displayed field.

14. The computer-readable storage medium of claim 12 wherein positive values are displayed when movement is in the direction above the displayed field and negative values are displayed when movement is in the direction below the displayed field.

15. The computer-readable storage medium of claim 2 wherein values displayed during the movement change at different speeds based on direction of the movement.

16. The computer-readable storage medium of claim 15 wherein the values change faster when the movement is in the direction above or below the displayed field than when the movement is to the right or left of the displayed field.

17. The computer-readable storage medium of claim 1 wherein the determining of the value is based on direction of the movement.

18. The computer-readable storage medium of claim 17 wherein when the field location is adjacent to a boundary of a display so that movement in a direction is limited, defining behavior for the determining of the value based on direction of movement in a precedent order.

19. The computer-readable storage medium of claim 1 wherein an initial value is displayed in the field and when the termination of the movement occurs within the displayed field, determining that the value is the initial value.

20. The computer-readable storage medium of claim 1 wherein when the displayed field includes multiple parts, determining which part of the displayed field to modify based on the direction of the movement.

21. The computer-readable storage medium of claim 1 wherein the computer-readable storage medium is a memory.

22. A device comprising:
   a touch-sensitive display;
   a memory storing computer-executable instructions of:
      a component for displaying a field on the touch-sensitive display;
      a component for receiving a selection of the displayed field via the touch-sensitive display;
      a component for receiving indications of movement relative to the displayed field via the touch-sensitive display and displaying indications of values for the displayed field based on the movement; and
      a component for, upon receiving an indication of termination of the movement, setting the value for the displayed field to the indicated value when the movement is terminated; and
   a processor that executes the computer-executable instructions stored in the memory.

23. The device of claim 22 wherein the device is selected from a group consisting of a cell phone, a personal digital assistant, and an electronic tablet.

24. The device of claim 22 including a component for displaying the set value in the displayed field.

25. The device of claim 22 wherein the selection is indicated by a touch of the touch-sensitive display at the displayed field, the movement is indicated by movement while touching the touch-sensitive display, and the termination is indicated by no longer touching the touch-sensitive display.

26. The device of claim 22 wherein the indications of the values are displayed at a location on the touch-sensitive display associated with the location of the current movement.

27. The device of claim 22 wherein a single value at a time is displayed during the movement.

28. The device of claim 22 wherein values displayed during the movement are based on distance between location of the displayed field and location of the movement.

29. The device of claim 22 wherein values displayed during the movement are based on speed of the movement.

30. The device of claim 22 wherein values displayed during the movement are based on direction of the movement.

31. The device of claim 30 wherein positive values are displayed when the movement is to the right of the displayed field and negative values are displayed when the movement is to the left of the displayed field.

32. The device of claim 30 wherein positive values are displayed when movement is above the displayed field and negative values are displayed when movement is below the displayed field.

33. The device of claim 22 wherein the values displayed during the movement change at different speeds based on direction of movement.

34. The device of claim 33 wherein the values change faster when movement is above or below the displayed field than when movement is to the right or left of the displayed field.

35. A computer-readable storage medium embedded with instructions for controlling a computing device to allow entry of data into a field via a touch-sensitive display, by a method comprising:
- displaying the field on the touch-sensitive display;
- receiving a selection of the displayed field via the touch-sensitive display;
- after selection of the displayed field, receiving indications of movement relative to the displayed field via the touch-sensitive display and displaying indications of values for the displayed field based on the movement; and
- upon receiving an indication of termination of the movement, setting a value for the displayed field to the indicated value when the movement is terminated.

36. The computer-readable storage medium of claim 35 wherein the values of the displayed indications are determined based on direction and speed of the movement.

37. The computer-readable storage medium of claim 36 wherein the selection is indicated by a touch of the touch-sensitive display at the displayed field, the movement is indicated by movement while touching the touch-sensitive display, and the termination is indicated by no longer touching the touch-sensitive display.

38. The computer-readable storage medium of claim 35 wherein the computer-readable storage medium is a memory.

* * * * *